Figure 1:
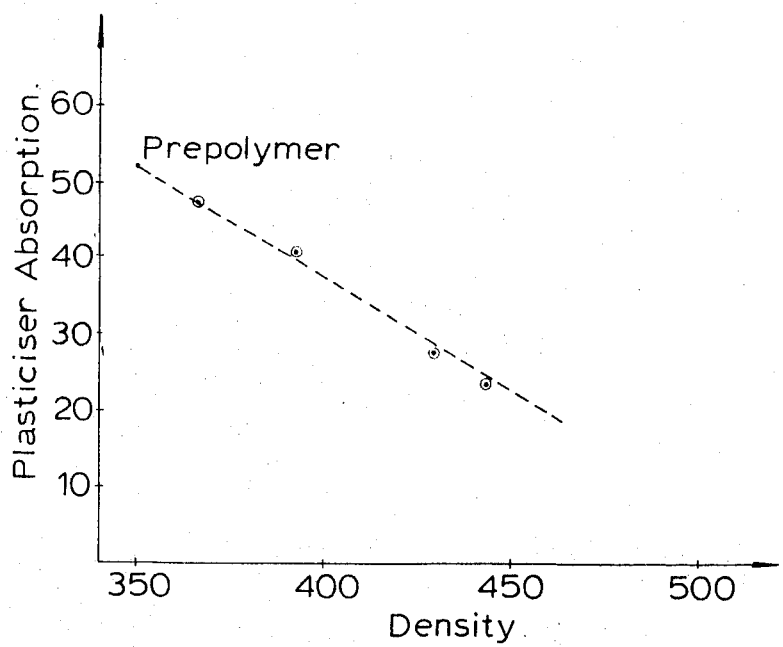

United States Patent [19]
Kulas et al.

[11] 3,857,801
[45] Dec. 31, 1974

[54] METHOD FOR OBTAINING A CONTROLLED INCREASE OF THE DENSITY OF POROUS POLYMERS

[75] Inventors: Finn Ragnar Kulas; Terje Ekeland, both of Porsgrunn, Norway

[73] Assignee: Norsk Hydro a.s., Oslo, Norway

[22] Filed: Mar. 23, 1973

[21] Appl. No.: 344,176

[30] Foreign Application Priority Data
Mar. 23, 1972  Norway................................ 993/72

[52] U.S. Cl. .......... 260/2.5 B, 260/92.8 W, 260/884
[51] Int. Cl. ............................................. C08f 47/08
[58] Field of Search ............ 260/92.8 W, 884, 2.5 B

[56] References Cited
UNITED STATES PATENTS

| | | | |
|---|---|---|---|
| 3,240,843 | 3/1966 | Nelson | 260/2.5 B |
| 3,383,346 | 5/1968 | Smith | 260/92.8 W |
| 3,663,655 | 5/1972 | Sturt | 260/880 R |
| 3,725,375 | 4/1973 | Sturt | 260/92.8 W |

*Primary Examiner*—Morton Foelak
*Attorney, Agent, or Firm*—Wenderoth, Lind & Ponack

[57] ABSTRACT

This invention relates to a method for increasing the density of porous polymers in a controlled manner by adding a monomer to a previously prepared porous polymer and subsequent polymerization of the added monomer, which method comprises performing the polymerization in aqueous suspension, whereby the amount of monomer is limited up to that which the initial porous polymer can absorb, and the monomer/polymer ratio is further calculated from equation 2 herein on the basis of the desired increase of the density of the polymer.

2 Claims, 2 Drawing Figures

METHOD FOR OBTAINING A CONTROLLED INCREASE OF THE DENSITY OF POROUS POLYMERS

The present invention relates to the production of polymer substances having a precalculated density (volume weight). The invention, being particularly suited for polyvinyl chloride (PVC) will in the following be described on the basis thereof. However, copolymers of PVC and also of other polymer substances can advantageously be used, provided they possess the powder properties on which the invention is based.

PVC is produced in several different qualities, all known polymerization methods being utilized, depending on the end use intended for the produced polymer.

Up to the present date, the most commonly used method is polymerization in aqueous suspension, and a PVC type which may advantageously be prepared in this manner is the socalled "general purpose" type. An important requirement for this type consists in good processing properties, and in order to achieve this it has proved necessary to aim at certain powder properties such as a uniform particle size and a narrow particle size distribution, high density and a certain porosity (which promotes a rapid plasticiser take-up). These properties are influenced by several factors during the polymerization process. In particular, the kind and amount of suspending agent and catalyst, stirring rate, temperature and degree of conversion are mentioned. Even small changes in the mentioned process variables may provide great changes in the properties of the final product, and it is difficult and time-consuming to change the polymerization conditions for the purpose of improving some of the less desirable properties of the final product without at the same time loosing other, desirable properties.

One particular problem in this connection is the desire of obtaining an increase of the density of the particles without altering essentially the particle size and the distribution thereof. Normally, the consequence of measures taken during the polymerization process in order to increase the density will be a very broad particle size distribution caused by a significant formation of new particles of essentially small size while at the same time agglomeration of smaller particles will also take place.

From the present state of art it must be regarded rather surprising that we have found a simple method for increasing the density of PVC powder in a controlled way, without any essential change in the average diameter or the size distribution of the particles.

The main feature of the invention comprises the addition to a prepolymer having suitable particle size and particle size distribution as well as great porosity, of a precalculated, on the basis of simple mathematical equations, amount of vinyl chloride monomer, all of which is absorbed in the free space volume, whereafter the vinyl chloride monomer polymerizes within the particles. Thus, the increase of the density of the prepolymer which is achieved, occurs substantially exclusively by reduction of the porosity of the particles. As will later be described more in detail, under predetermined conditions there exists a generally valid, linear relationship between the monomer/prepolymer ratio and the density and porosity of the final polymer and, thus, the present invention makes it possible to obtain a predetermined increase in the density of the prepolymer by adjusting the ratio between the monomer and prepolymer to the calculated value. The free space volume of the particles and the desired residual porosity of the final product are the only factors which put a limit to the increase of the density to be obtained with a given prepolymer. If the desired density of the final product is greater than this limit, one must start with a prepolymer having greater porosity and/or larger particle diameter.

In the following, we shall explain briefly the simple mathematic basis of the invention.

Considering a porous powder the particles of which are spheroidal and of equal diameter, the space volume of an individual polymer particle may be represented by the equation $$v = V - P/d$$

in which
 $v$ = space volume
 $V$ = the volume of the particle
 $P$ = the weight of the particle $d$ = the density of the material in the particle Since $V = \pi/6\ \mu^3$ ($\mu$ = particle diameter), the relationship between the space volume ($v$) and the particle weight ($P$) will be, provided the particle volume remains unchanged: $v = \pi/6\ \mu^3 - P/d$. A definition for the space volume would be the ability of the particle to absorb plasticiser ($\phi$). When the particles are essentially spheroidal and the size distribution between them is not too broad, the particle weight ($P$) may be replaced by the density ($P_v$).

This gives: $\phi = K_1 \cdot \mu^3 - K_2 P_v$     (1)

$K_1$ replaces $\pi/6$ because here we consider a powder instead of ideal individual particles. Similarly, $K_2$ is a constant, depending only on the polymeric material in the particles.

Experiments with absorption of varying amounts of monomer into two different, arbitrarily chosen, porous PVC types (cf. Tables A and B and the accompanying FIGS. 1 and 2) clearly illustrate that the relationship shown between porosity (plasticiser absorption) and density reflect the conditions in practice (provided no agglomeration or formation of new particles take place during the post-polymerization).

Table A (cf. FIG. 1)

| Experiment | Monomer/prepolymer ratio | Density | Porosity[*] |
|---|---|---|---|
| a | 1.15 | 443 | 23 |
| b | 0.98 | 430 | 27 |
| c | 0.52 | 390 | 40 |
| d | 0.20 | 367 | 47 |
| Prepolymer A | — | 350 | 52 |

[*] grams of plasticiser per 100 grams of polymer.

Figure 2:
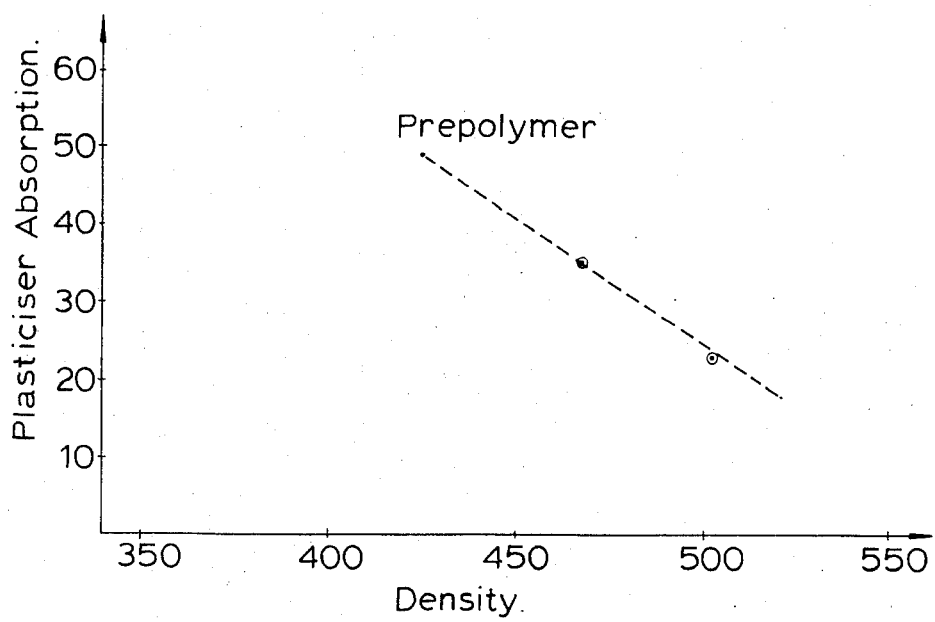

Table B (cf. FIG. 2)

| Experiment | Monomer/prepolymer ratio | Density | Porosity |
|---|---|---|---|
| e | 0.98 | 505 | 23 |
| f | 0.52 | 465 | 35 |
| Prepolymer B | — | 425 | 49 |

As can be easily seen, there is direct relationship in the weight ratio between monomer/prepolymer ($m_{vc}/m_{pvc}$) and the density ($P_v$) and porosity ($\phi$), respectively, of the powder:

$$P_v = P_v^\circ + K_3 (m_{vc}/m_{pvc}) \tag{2}$$

$$\phi = \phi^\circ - K_4 (m_{vc}/m_{pvc}) \tag{3}$$

in which $\phi^\circ$ means the porosity of the prepolymer and $P_v^\circ$ means the density of the prepolymer. The constants $K_3$ and $K_4$ are readily calculated, e.g., from Table A, to $K_3$ about 80 and $K_4$ about 25.

The equations (2) and (3) form the simple, generally valid mathematic basis for the method of the invention.

Both equations make it possible to calculate a specific ratio of monomer/prepolymer to obtain a desired increase in density or residual porosity, respectively, of the final product. In most cases it is suitable to start with equation (2) and calculate the necessary monomer/prepolymer ratio which gives a desired density increase. However, if a certain porosity is desired in the final product, it should be started with equation (3). The density increase which corresponds to this final porosity may then be calculated from equation (2). In the accompanying examples this is illustrated more closely.

In practice, the absorption of the calculated amount of monomer in the prepolymer may be performed in different ways. For example, one may add liquid monomer to a dry powder of prepolymer and then prepare a dispersion by adding water while stirring, but one may also first disperse the prepolymer in water and then add the liquid monomer. In the latter case, the monomer is absorbed by the prepolymer and thereby displaces the water. Any known catalyst may be used and the catalyst may be added as a solution in the monomer or predispersed in the aqueous phase. In certain cases even those catalyst residues which often remain in the prepolymer will be sufficient.

In most cases, it is unnecessary to use a suspending agent in the post-polymerization process. In those cases, however, where relatively high monomer/prepolymer ratios (about 1) are used, a certain amount of suspending agent may be necessary. However, it should always be taken care that any added portions are not too high, as this might cause stabilization of the monomer droplets in the aqueous phase so that the absorption is hindered.

The advantages of the invention are numerous, e.g., the planned controlling of the density of the polymer, in which up to now has been entirely unachievable. Further advantages are, e.g., a steady production, a simple production control and complete elimination of problems with respect to deposit formations in the autoclaves.

EXAMPLE 1

We start with the prepolymer used in Table A (density = 350, porosity = 52) and desire to increase the density of this prepolymer to 410.

In equation (2) 350 is inserted for $P_v^\circ$, which gives: $410 = 350 + 80 (m_{vc}/m_{pvc})$ from which the $(m_{vc}/m_{pvc})$ ratio is calculated to 0.75.

In a 40 litres autoclave the prepolymer (5.2 kgs.) is dispersed in water (24.8 kgs.). The autoclave is closed and evacuated. Then vinyl chloride (3.9 kgs.) is sucked in, in which lauroyl peroxide (5.5 grams) has been dissolved (0.14% of the monomer). Stirring is performed for one-half hour whereafter the temperature is raised to 54°C. After 4.5 hours the pressure has dropped to 5 atmospheres and the polymerization is discontinued. After discharging, filtering and drying 7.9 kgs. of PVC are obtained, having a density of 412 and a porosity of 33.

The grain size distribution of the polymer powder before and after the treatment was, according to Table C, essentially unchanged:

Table C

| Grain size /µ | >250 | 250/17 | 177/125 | 125/88 | 88/03 | <63 |
|---|---|---|---|---|---|---|
| Before post-polymerization | 0% | 1% | 11% | 78% | 10% | 0% |
| After post-polymerization | 0% | 1% | 25% | 72% | 2% | 0% |

Similarly, the average grain size was essentially unchanged and the autoclave was completely free of deposits.

EXAMPLE 2

The starting material was a prepolymer having a density of 425 and a porosity of 49 (cf. Table B), and it was desired to increase the density of this powder to 500. From equation (3) the monomer/prepolymer ratio was calculated to:

$$500 - 425/80 = 0.94$$

In a 40 litres autoclave 4.4 kgs. of the above polymer powder and 6.2 grams (0.14% of the calculated monomer amount) of benzoyl peroxide were charged, whereupon the autoclave was closed and evacuated. Then vinyl chloride (4.7 kgs.) was sucked in. Then, after a short stirring period a 0.02% aqueous solution (24.8 kgs.) of methyl cellulose ("Methocel 65 MG" ex Dow) was added under pressure. After this, a vigorous stirring is performed for one-half hour whereafter the temperature is raised to 54°C.

After 5 hours the pressure in the autoclave has dropped to 4 atmospheres and the post-polymerization is discontinued by cooling the autoclave to room temperature. After discharging, filtering and drying 7.8 kgs. of PVC powder having a density of 498 and a residual porosity of 25 are obtained.

The analysis of the powder regarding the grain size distribution before and after the treatment is illustrated in Table D.

Table D.

| Grain size, µ | >250 | 250/177 | 177/125 | 125/88 | 88/63 | <63 |
|---|---|---|---|---|---|---|
| Before post-polymerization | 0% | 1% | 48% | 48% | 2% | 0% |
| After post-polymerization | 0% | 2% | 62% | 35% | 1% | 0% |

Thus, nor in this case any essential change in the grain distribution has taken place.

EXAMPLE 3

The starting material is the same prepolymer as used in Example 1 (density = 350, porosity = 52) and it is desired to increase the density of this powder at the same time to achieve a residual porosity of the final product of 35. Accordingly, equation (3) is used, $$m_{vc}/m_{pvc} = 52 - 35/(25) = 0.68$$

This ratio will simultaneously determine the maximum obtainable increase of the density, and insertion in equation (2) gives:

$$P_v = 350 + 80 \cdot 0.68 = 404.$$

In a 40 litres autoclave water (24.8 kgs.) and PVC prepolymer (5350 grams) are charged. Evacuation is performed and vinyl chloride (3750 grams) in which is dissolved lauroyl peroxide (5.25 grams) is sucked in. After one-half hour of stirring the temperature is raised to 54°C. After 5 hours the autoclave pressure has dropped to 5 atmospheres, the pressure is then released and the powder separated, washed and dried. Yield: 7800 grams of PVC powder having a porosity (plasticiser absorption) of 35 and a density of 410.

The particle size distribution before and after the treatment is illustrated in Table E.

Table E.

| Grain size, /μ | > 250 | 250 /177 | 177 /125 | 125 /88 | 88 /63 | < 63 |
|---|---|---|---|---|---|---|
| Before post-polymerization | 0% | 1% | 11% | 78% | 10% | 0% |
| After post-polymerization | 0% | spor | 20% | 76% | 4% | 0% |

The average particle diameter was essentially unchanged and the autoclave was completely free of deposits.

What is claimed is:

1. In a method for increasing the density of porous polymers in a controlled manner by adding a vinyl chloride monomer to a previously prepared porous polyvinyl chloride and subsequently polymerizing the added monomer, the improvement wherein the polymerization is effected in an aqueous suspension, whereby the amount of vinyl chloride monomer is limited up to that which the initial porous polymer can absorb, and the monomer/polymer ratio is further calculated on the basis of the desired increase of the density of the polymer according to the following equation:

$$P_v = P_v^\circ + K\ (m_{vc}/3m_{pvc})$$

wherein $P_v$ is the desired density of the polymer, $P_v^\circ$ relates to the density of the prepolymer, $m_{vc}$ relates to the weight of the monomer, $m_{pvc}$ relates to the weight of the prepolymer, and $K_3$ is a constant.

2. The improvement of claim 1, wherein the density increase is determined on the basis of the desired residual porosity of the final product by means of the following equation:

$$\phi = \phi^\circ - K_4\ (m_{vc}/m_{pvc})$$

wherein $\phi$ is the porosity of the desired product, $\phi^\circ$ is the porosity of the prepolymer, $K_4$ is a constant, $m_{vc}$ is the weight of the monomer, and $m_{pvc}$ is the weight of the prepolymer, and calculating the monomer/polymer ratio on the basis of said desired porosity.

* * * * *